A. BENSON.
PROCESS OF CUTTING WORM GEARS.
APPLICATION FILED SEPT. 8, 1913.

1,302,126. Patented Apr. 29, 1919.

Witnesses:
Wm. Guger
Esther Abrams

Inventor:
Andrew Benson
By
Munday, Evarts, Adcock & Clarke
Attys.

UNITED STATES PATENT OFFICE.

ANDREW BENSON, OF CHICAGO, ILLINOIS, ASSIGNOR TO BENSON GEAR COMPANY, OF CHICAGO, ILLINOIS, A CORPORATION OF ILLINOIS.

PROCESS OF CUTTING WORM-GEARS.

1,302,126.  Specification of Letters Patent.  Patented Apr. 29, 1919.

Application filed September 8, 1913. Serial No. 788,551.

*To all whom it may concern:*

Be it known that I, ANDREW BENSON, a citizen of the United States, residing in Chicago, in the county of Cook and State of Illinois, have invented a new and useful Improvement in Processes of Cutting Worm-Gears, of which the following is a specification.

This invention relates to improvements in the process of cutting worm-gears and more particularly to the process of cutting the teeth of worm-gears such as are used with worms of the "Hindley" screw type and is in the nature of an improvement of the process described in my co-pending application #745891, filed February 3, 1913, for process of cutting worm-gears.

Objects of the invention are to devise a process of cutting the worm-gears of the type above indicated, which is rapid and simple; which insures the cutting of perfectly formed teeth; and which is applicable to the cutting of the teeth of worm-gears of any size, of any desired pitch and having any desired number of teeth.

The invention furthermore consists in the improvements in the steps and in the novel combinations of the steps of the process as herein shown, described or claimed.

In my said co-pending application, I have described a process of cutting worm-gears of the type above indicated in which two sets of cutters are used, each set cutting corresponding faces of the worm-gear teeth only, one set cutting the advancing faces and the other set cutting the receding faces of the worm-gear as the latter rotates. Each of the active portions of the cutters corresponds to a portion of a thread of the "Hindley" screw or worm with which the worm-gear is to be used. I have discovered, and herein my invention consists, that a single cutter having its active cutting edges corresponding to parts of the threads of a "Hindley" screw or worm, may be used to cut all the faces of the worm-gear teeth which face in one direction at one time and that by changing the relative positions or directions of rotation or both, of the cutters and worm-gear blank, the same cutter may be employed to cut or generate all the oppositely disposed faces of the teeth of the worm-gear, thus simplifying the mechanism required for carrying out the process and insuring a perfect duplication of the faces of the teeth of the worm-gear.

Figure 1:
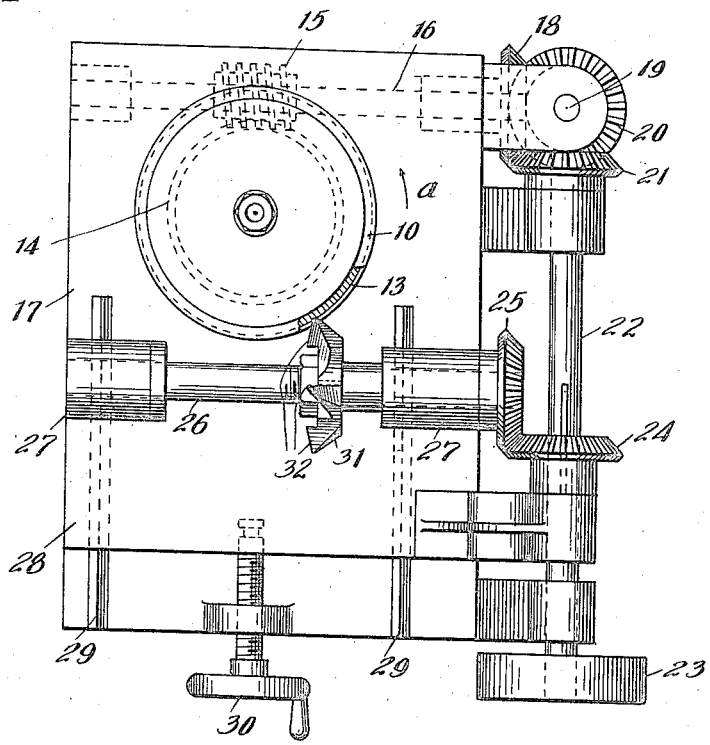
Figure 2:
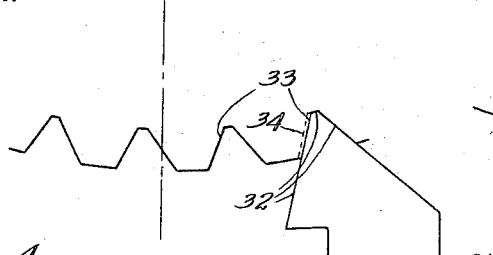
Figure 3:
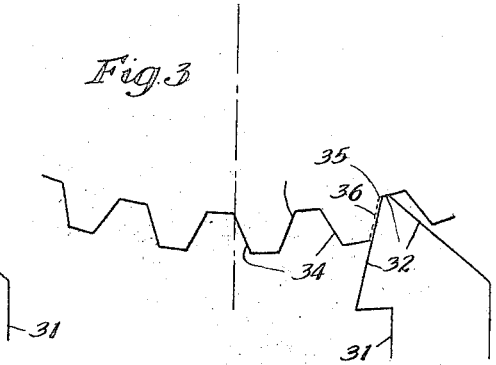

In the drawing forming a part of this specification I have illustrated sufficiently, mechanism suitable for carrying out my improved process and in said drawing, Figure 1 is a top plan view of a gear cutting machine illustrating the manner of carrying out my process. Fig. 2 is a diagrammatic view showing a portion of the worm-gear and one of the active portions of the cutter, said view illustrating in full lines the worm-gear at the end of the first rough cutting step, the dotted lines showing how a final finishing cut is employed to finish all the faces of the teeth facing in the same direction. Fig. 3 is a similar diagrammatic view illustrating in full lines the worm-gear at the end of the operation which cuts the remaining faces of the teeth, the dotted lines showing how the finishing or final cut is made to finish said faces of the teeth, and Fig. 4 is a sectional view showing the worm-gear and "Hindley" screw or worm of the type to which my improvements relate.

Figure 4:
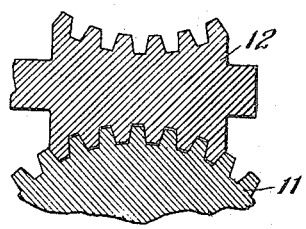

In said drawing, 10 denotes the blank or casting which is adapted to be cut to form a worm-gear such as shown at 11 in Fig. 4 and adapted to coöperate with a "Hindley" screw or worm 12.

In carrying out my process, the blank 10 will ordinarily be concaved on its peripheral edge as shown at 13 so that the finished worm-gear will properly fit the worm. The worm-gear blank is then placed on an arbor rotatable about a vertical axis and clamped thereon and rotated in the direction indicated by the arrow *a* in Fig. 1, said arbor on which the blank is mounted being driven by a worm-gear 14, worm 15 and shaft 16, the latter being suitably mounted in a frame 17. The shaft 16 has a bevel gear 18 thereon meshing with a bevel gear (not shown) on the lower end of a vertical shaft 19, said shaft at its upper end having a bevel gear 20 meshing with another bevel gear 21 on a horizontally extending shaft 22. The shaft 22 is rotated by any suitable source of outside power through a pulley 23. Keyed to the shaft 22 and slidable thereon is a bevel gear 24 which meshes with another bevel gear 25 on the end of a horizontally extending shaft or arbor 26 mounted in bearings 27 on a slide 28, the latter moving on guideways 29 on top of the frame 17. The slide 28 is movable inwardly and outwardly toward the arbor supporting the worm-gear blank by means of a hand-operated swiveled adjusting screw 30. Mounted on the shaft or arbor 26 is a cutter 31, the latter having a plurality of active cutting points or portions 32 each of which corresponds to a portion of a thread of the "Hindley" screw or worm with which the worm-gear being cut is adapted to operate, it being understood that the cutting edges of the portions 32 are arranged radially of the arbor 26 and at an angle thereto similar to that of the face of that portion of the thread of the worm to which the cutting portion corresponds. As appears from an inspection of Fig. 1 of the drawing, the cutter 31 which I have shown is provided with four cutting portions 32. This will be the form of cutter used when the corresponding worm has four threads but, as will be understood, the number of cutting portions 32 will depend upon and correspond to the number of threads on the worm.

The operation of cutting the worm-gear teeth is as follows: The worm-gear blank and the cutter are rotated continuously and simultaneously with predetermined ratio of speeds, this ratio depending upon the number of teeth to be cut in the worm-gear and the number of threads on the worm. As the blank and cutter rotate, the latter will be fed forward gradually toward the blank by turning the adjusting screw 30, whereupon the cutting portions 32 will generate or cut all the forward or advance faces 33 of the worm-gear teeth as indicated in Fig. 2. The faces of the teeth thus cut will be, for all ordinary purposes, sufficiently accurate, but I have found that more perfect teeth may be formed by advancing slightly the position of the blank 10 on its arbor, angularly, relatively to the cutter and then taking a final or finishing cut as indicated by the dotted lines 34 in Fig. 2. If the advancing faces of the worm-gear teeth are cut to their full depth as the cutter is advanced toward the blank, it will be found that certain portions of the faces will be slightly over-cut, although the greater portions of the faces of the teeth will be perfectly and accurately formed. By taking the final finishing cut in the manner above described, all excess cutting of the faces of the teeth is thereby avoided.

After all the faces of the teeth facing in one direction have been cut as above described, it is then necessary to change the relative rotations of the cutter and blank so that the cutter will generate or cut all the oppositely disposed faces of the worm-gear teeth. This may be done in one of several ways and with the mechanism shown in the drawing the preferable way is to remove the blank 10 from its arbor and clamp it thereon in the reverse position to that first occupied and then continue the operation as before. As will be apparent, the reversing of the blank 10 in the manner just described amounts to a change in relative directions of rotation of the cutter and blank and the blank may be considered as having had its axis revolved through an angle of 180° about a point in the shortest line between its axis of rotation and the axis of rotation of the cutter. In other words, the cutter 31 will be fed gradually toward the blank to either cut or generate the opposite faces 35 of the worm-gear teeth as shown in full lines in Fig. 3 and a finishing or final cut will be given these faces 35 by advancing the blank 10 a slight amount angularly, relatively to the cutter, in the manner heretofore described, to thereby make the cuts as shown by the dotted lines 36.

From the preceding description, it will be seen that while cutting the faces 33 of the worm-gear teeth, the cutter crosses or traverses the peripheral edge of the worm-gear blank in one direction, that is in a direction from the top face to the bottom face of the blank as shown in Fig. 1 and while cutting the opposite faces 35 of the worm-gear teeth, the cutter traverses or crosses the peripheral edge of the worm-gear blank in a relatively reverse direction, viz: from what is the bottom face of the blank 10 to the top face thereof as the blank is shown in Fig. 1, or from the top face to the bottom face thereof after the blank has been reversed. Another method of accomplishing the same result would be by cutting the faces 33, as above described, and then changing the position of the cutter 31 so that it occupies a reverse position on the left of the shortest line between the two perpendicular axes of rotation of the cutter and blank. In this case the directions of rotation of the cutter and blank would have to be reversed. Still another way of accomplishing the same result would be to perform the first operation as herein described for cutting the faces 33 and then place the blank on an arbor on the opposite side of the cutter shaft 26 without reversing the position of the blank. In this case, the directions of rotation of the cutter and blank would be as at first.

From the foregoing description, it will be seen that the teeth on the worm-gear will be accurately and uniformly cut on both sides by the same cutter, that the method may be carried out rapidly and easily without the aid of skilled labor and that the method of cutting the worm-gear teeth is simpler than any heretofore practised.

I claim:

1. The process of cutting worm-gears adapted for use with worms of the "Hindley" screw type, which consists in rotating a cutter and a worm-gear blank simultaneously and at a predetermined ratio of speeds about two axes perpendicular to each other, the cutter being rotated to traverse the peripheral edge of the blank in one direction to cut the faces of all the teeth facing in one direction and then changing the relative arrangement of the cutter and blank so that the cutter is rotated to traverse the peripheral edge of the blank in the opposite direction to cut the faces of all the teeth facing in the opposite direction to those cut by the first operation, substantially as specified.

2. The process of cutting worm-gears adapted for use with worms of the "Hindley" screw type, which consists in rotating a cutter and a worm-gear blank simultaneously and at a predetermined ratio of speeds about two axes perpendicular to each other, the cutter being rotated to traverse the peripheral edge of the blank in one direction to cut the faces of all the teeth facing in one direcion to an approximate final contour, then advancing the blank angularly, slightly, relatively to the cutter and taking a final finish cut on each of said faces, then changing the relation of the cutter and blank so that the cutter is rotated to traverse the peripheral edge of the blank in the opposite direction to cut the faces of all the teeth facing in the opposite direction to those cut by the first operation to an approximate final contour and finally advancing the blank angularly, slightly, relatively to the cutter and taking a final finish cut on each of the last named faces of the blank, substantially as specified.

3. The process of cutting worm-gears of the character described, which consists in rotating a cutter and a worm-gear blank simultaneously and at a predetermined ratio of speeds about two axes perpendicular to each other and moving one of said members toward the other while maintaining the perpendicular relation between said axes of rotation, the cutter being rotated to traverse the peripheral edge of the blank in one direction to cut the faces of all the teeth facing in one direction, then changing the relative positions of the cutter and blank so that the cutter is rotated to traverse the peripheral edge of the blank in the opposite direction to cut the faces of all the teeth facing in the opposite direction to those cut by the first operation and at the same time advancing the cutter and blank relatively toward each other, substantially as specified.

4. The process of cutting worm-gears of the character described, which consists in simultaneously and at a predetermined ratio of speeds rotating a cutter and a worm-gear blank about two axes perpendicular to each other and at the same time gradually advancing the cutter toward the blank, the cutter being rotated to traverse the peripheral edge of the blank in one direction to cut the faces of all the teeth facing in one direction and then changing the relative positions of the cutter and blank so that the cutter is rotated to traverse the peripheral edge of the blank in the opposite direction to those cut by the first operation and at the same time moving the cutter toward the blank, substantially as specified.

5. The process of cutting worm-gears adapted for use with worms of the "Hindley" screw type, which consists in simultaneously rotating a cutter and a blank about two axes perpendicular to each other to cut those faces of the worm-gear teeth which face in one direction, then changing the relative directions of rotation of the cutter and blank by turning the axis of one of them through an angle of 180° about a point in the shortest line between said two axes of rotation and then continuing the rotation of the cutter and blank to cut the opposite faces of the worm-gear teeth, substantially as specified.

6. The process of cutting worm-gears adapted for use with worms of the "Hindley" screw type, which consists in simultaneously rotating a cutter and a blank about two axes perpendicular to each other to cut all those faces of the worm-gear teeth facing in one direction to approximately their final contour, then advancing the position of the blank angularly, slightly, relatively to the cutter and taking a final finish cut on said faces, then changing the relative directions of rotation of the cutter and blank by turning the axis of one of them through on angle of 180° about a point in the shortest line between said two axes of rotation and then continuing the simultaneous rotation of the cutter and blank to cut the opposite faces of the worm-gear teeth to an approximate final contour and finally advancing the blank angularly, slightly, relatively to the cutter and taking a final finish cut on each of said last named faces, substantially as specified.

7. The process of cutting worm-gears of the character described, which consists in simultaneously rotating a cutter and a blank about two axes perpendicular to each other to cut all the faces of the worm-gear teeth facing in one direction, then turning the blank up-side-down and continuing the rotation as at first to cut all the opposite faces of the worm-gear teeth with the same cutter, substantially as specified.

8. The process of cutting worm-gears of the character described, which consists in simultaneously rotating a cutter and a blank about two axes perpendicular to each other to cut all the faces of the worm-gear teeth facing in one direction, then moving the blank into reverse relation with respect to the cutter and continuing the rotation as at first to cut all of the opposite faces of the teeth.

Signed this 4th day of September, 1913, in the presence of two witnesses.

ANDREW BENSON.

Witnesses:
 JOSEPH HARRIS,
 WILLIAM A. GEIGER.